United States Patent
Guru et al.

(10) Patent No.: US 10,297,169 B2
(45) Date of Patent: May 21, 2019

(54) INTUBATION SIMULATOR AND METHOD

(71) Applicant: Health Research, Inc., Buffalo, NY (US)

(72) Inventors: Khurshid Guru, East Amherst, NY (US); Ashirwad Chowriappa, Bangalore (IN)

(73) Assignee: Health Research, Inc., Buffalo, NY (US)

( * ) Notice: Subject to any disclaimer, the term of this patent is extended or adjusted under 35 U.S.C. 154(b) by 249 days.

(21) Appl. No.: 15/109,702

(22) PCT Filed: Jan. 5, 2015

(86) PCT No.: PCT/US2015/010202
§ 371 (c)(1),
(2) Date: Jul. 5, 2016

(87) PCT Pub. No.: WO2015/103567
PCT Pub. Date: Jul. 9, 2015

(65) Prior Publication Data
US 2016/0335918 A1    Nov. 17, 2016

Related U.S. Application Data

(60) Provisional application No. 61/923,691, filed on Jan. 5, 2014.

(51) Int. Cl.
*G09B 23/28* (2006.01)
*G09B 23/32* (2006.01)

(52) U.S. Cl.
CPC ........... *G09B 23/285* (2013.01); *G09B 23/32* (2013.01)

(58) Field of Classification Search
CPC ...... G09B 23/28; G09B 23/285; G09B 23/32; G09B 23/30; A61B 1/267; A61B 34/70; A61M 16/0472
See application file for complete search history.

(56) References Cited

U.S. PATENT DOCUMENTS 6,123,666 A    9/2000  Wrenn et al.
6,422,873 B1   7/2002  Abdelatti
(Continued)

FOREIGN PATENT DOCUMENTS

WO    2012101254    8/2012

OTHER PUBLICATIONS

Baheti, et al., Real-Time Fiber-Optic Intubation Simulator With Force Feedback, Mechatrinics, IEEE/ASME Transactions, vol. 17, pp. 98-106 Dec. 20, 2010.
(Continued)

*Primary Examiner* — Jerry-Daryl Fletcher
(74) *Attorney, Agent, or Firm* — Hodgson Russ LLP (57) ABSTRACT

An intubation simulator and method are disclosed. The simulator includes a human mannequin with a mouth and a sensorized conduit. A glide scope disposed in the sensorized conduit. A first manipulator and a second manipulator are connected to the glide scope by way of a linkage. A method for simulating intubation is disclosed, where an intubation simulator is provided, computer-based instructions are provided to cause a first and second manipulator of the simulator to simulate the haptic environment of a human through the glide scope. A sensorized conduit of the simulator is used to sense a position of a tracheal tube being placed during the simulated intubation.

17 Claims, 7 Drawing Sheets

(56) References Cited

U.S. PATENT DOCUMENTS

| | | |
|---|---|---|
| 7,811,090 B2 | 10/2010 | Eggert et al. |
| 7,976,313 B2 | 7/2011 | Eggert et al. |
| 8,152,532 B2 | 4/2012 | Eggert et al. |
| 8,382,485 B2 | 2/2013 | Bardsley et al. |
| 8,827,720 B1 * | 9/2014 | Lazarus ................. G09B 23/34 |
| | | 434/262 |
| 2004/0234933 A1 | 11/2004 | Dawson et al. |
| 2005/0244801 A1 | 11/2005 | DeSalvo |
| 2007/0122785 A1 * | 5/2007 | Eggert ................... G09B 23/28 |
| | | 434/272 |
| 2008/0004634 A1 | 1/2008 | Farritor et al. |
| 2008/0187896 A1 | 8/2008 | Savitsky |
| 2011/0020779 A1 | 1/2011 | Hannaford et al. |

OTHER PUBLICATIONS

French, et al., High performance force feedback mechanism for virtual reality training of endotracheal intubation, ISA Transactions, vol. 43, pp. 85-98 Jan. 1, 2004.

Mayrose, et al., Utilization of virtual reality for endotracheal intubation training, Resuscitation, vol. 59, pp. 133-138 Oct. 1, 2003.

* cited by examiner

INTUBATION SIMULATOR AND METHOD

CROSS-REFERENCE TO RELATED APPLICATIONS

This application claims priority to U.S. Provisional Application No. 61/923,691, filed on Jan. 5, 2014, the disclosure of which is incorporated herein by reference.

FIELD OF THE DISCLOSURE

The disclosure relates to a haptic simulator and, in particular, to a haptic simulator that simulates tracheal intubation.

BACKGROUND OF THE DISCLOSURE

Tracheal intubation places a flexible plastic tube into the trachea to maintain an open airway or to administer drugs. Many times this is performed on injured, ill, or anesthetized patients to allow ventilation of the lungs or to prevent asphyxiation or airway obstruction.

Tracheal intubation is an invasive and potentially uncomfortable procedure for the patient. A tracheal intubation also can be challenging for medical personnel to perform. An unusual airway anatomy, patient obesity, presence of fluids in the trachea, swelling, tumors, an uncooperative patient, or injuries to the neck, mouth, or throat can all compound the difficulty of the procedure. Tracheal intubations can be even more complicated on children or infants due to differences in anatomy or size of the mouth or trachea.

Tracheal intubation can lead to complications such as, for example, broken teeth, lacerations of the mouth or upper airway, or damage to the vocal cords. It also can lead to potentially fatal complications such as pulmonary aspiration of stomach contents, which can result in a severe or fatal chemical aspiration pneumonitis, or unrecognized intubation of the esophagus, which can lead to potentially fatal anoxia. Other injuries or conditions, some of which can be life-threatening, also can result from tracheal intubation. In a worst case scenario, failure to properly deliver oxygen to the lungs through tracheal intubation can lead to brain damage or death.

Having medical personnel practice tracheal intubation may effectively reduce or eliminate the associated risks. However, it is difficult to practice tracheal intubation on a real patient without exposing this patient to the associated risks. Simulators lack the ability to simulate different environments or scenarios and may not effectively train medical personnel. Simulators also lack the ability to effectively evaluate performance of the user. Due to the complicated nature of tracheal intubation and the potential injuries that can be caused to a patient, an improved haptic simulator for intubation is needed.

BRIEF SUMMARY OF THE DISCLOSURE

An intubation simulator is disclosed, comprising a human mannequin having a head and a torso, said human mannequin defining a mouth and a sensorized conduit; a glide scope disposed in said sensorized conduit; through said mouth; a first haptic manipulator connected to said glide scope through said head, wherein said first haptic manipulator is configured to provide force in three dimensions; a second haptic manipulator connected to said glide scope through said torso, wherein said second haptic manipulator is configured to provide force in three dimensions; and a linkage connecting said first haptic manipulator and said second haptic manipulator to said glide scope.

A method is disclosed, the method comprising providing an intubation simulator having a human mannequin comprising a head and a torso, said human mannequin defining a mouth and a sensorized conduit; a glide scope disposed in said sensorized conduit; through said mouth; a first haptic manipulator connected to said glide scope through said head, wherein said first haptic manipulator is configured to provide force in three dimensions; and a second haptic manipulator connected to said glide scope through said torso, wherein said second haptic manipulator is configured to provide force in three dimensions. The method further comprises providing instructions for said first haptic manipulator and said second haptic manipulator to represent a simulated environment; and sensing a position of a tracheal tube in said sensorized conduit.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Embodiments of the haptic intubation simulator disclosed herein provide an augmented reality system that can be used to produce a simulated environment for tracheal intubation training or tracheal tube insertion training. This simulator may be used to simulate various scenarios of endotracheal intubation.

Figure 1:
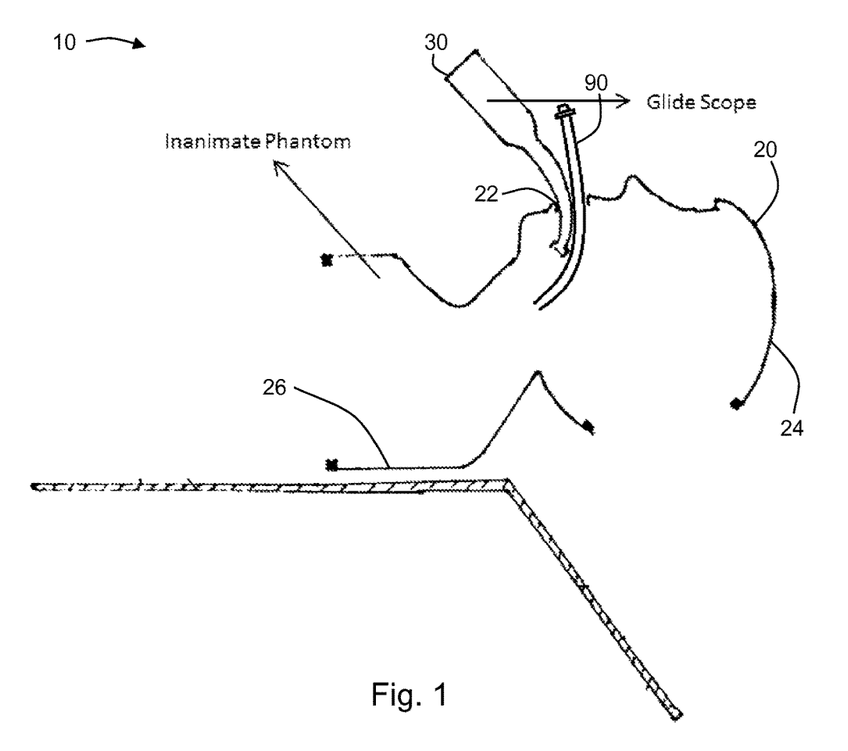
FIG. 1 is a cross-sectional side view of an embodiment of a haptic intubation simulator.

FIG. 1 is a cross-sectional side view of an embodiment of a haptic intubation simulator 10 according to the present disclosure. The simulator 10 includes a human mannequin 20 with a head 24 and torso 26. The human mannequin 20 also has a mouth 22 and a sensorized conduit 36. The sensorized conduit 36 may represent the trachea of the human mannequin 20, but also may be a conduit inside the human mannequin 20 where a tracheal tube 90 may be inserted that lacks the structure of a human trachea. The human mannequin 20 may be sized as an adult, teenager, child, infant, or other ages. The human mannequin 20 can vary in dimensions to represent various heights or weights for particular simulations. A glide scope 30 (or laryngoscope 30) and a tracheal tube 90 are placed in the mouth 22 of the human mannequin 20. The glide scope 30 may be coupled to other components in the simulator 10. The tracheal tube 90 may be coupled to other components in the simulator 10 or may be independent of the simulator 10. In one example, a disposable or standard medical tracheal tube 90 is used.

Figure 2:
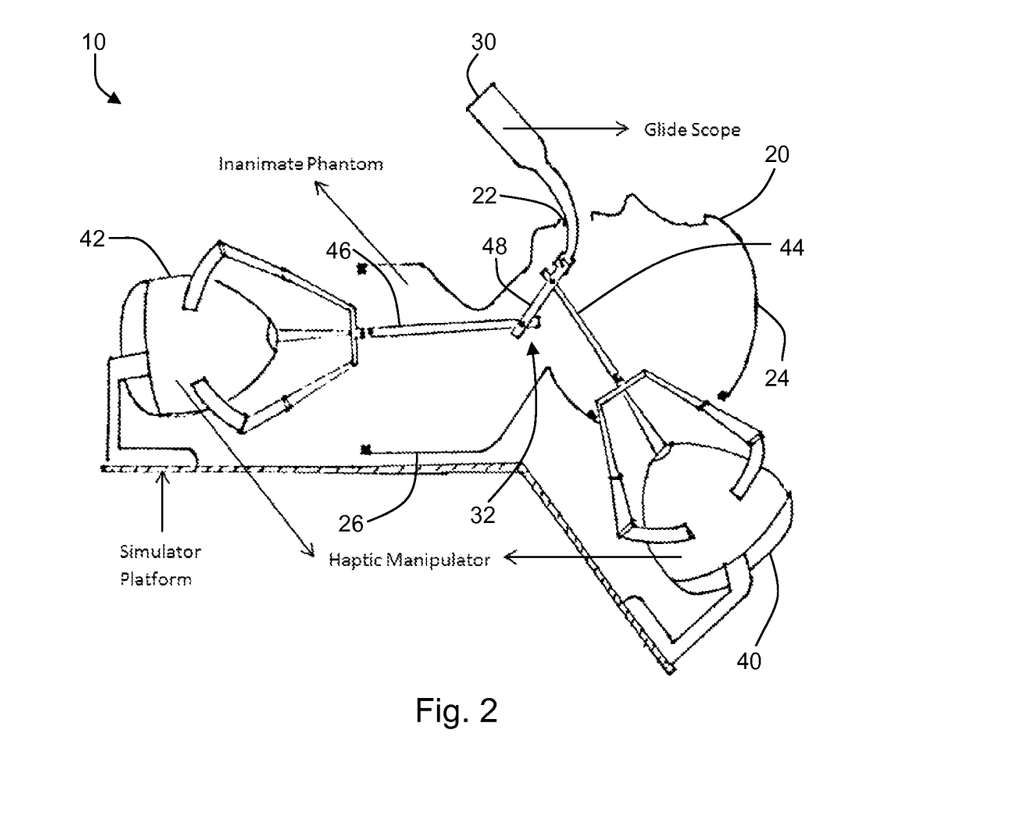
FIG. 2 is another cross-sectional side view of an embodiment of the haptic intubation simulator.

FIG. 2 is another cross-sectional side view of an embodiment of the haptic intubation simulator 10. As seen in FIG. 2, the human mannequin 20 may be connected to or rest on a platform or base. Two haptic manipulators are connected to the glide scope 30. A first haptic manipulator 40 is located under the head 24 of the human mannequin 20 and a second haptic manipulator 42 is located in or around the torso 26 of the human mannequin 20. The first haptic manipulator 40 and second haptic manipulator 42 are connected to the glide scope 30 through the head 24 and torso 26 of the human mannequin 20, respectively. Of course, the first haptic manipulator 40 and second haptic manipulator 42 can be located elsewhere with respect to the human mannequin 20 or connected to the glide scope 30 through the human mannequin 20 in different manners.

The first haptic manipulator 40 and second haptic manipulator 42 apply force, vibrations, or motions to the glide scope 30. Movement of the glide scope 30 may be limited to a 4"×4"×4" working area in one example, though other working areas are possible depending on the specifications of the first haptic manipulator 40 and second haptic manipulator 42. For example, the first haptic manipulator 40 and second haptic manipulator 42 may provide force in three dimensions as a vector of magnitude and direction. This force may be provided in conjunction with creation of a simulated environment. In one example, approximately 2 lbs. of force may be generated by the first haptic manipulator 40 and second haptic manipulator 42. The normal reaction force of the point of contact with the virtual instrument (i.e., the glide scope 30) in the virtual environment are computed as the normal vector to the virtual surface point of contact and magnitude of the vector is proportional to the product of surface stiffness and penetration depth of the virtual instrument.

In a particular embodiment, 3DOF Novint Falcon haptic manipulators are used. In this embodiment, the work space is 4"×4"×4", the device size is 9"×9"×9", the weight is 6 lbs., and the force capability is 2 lbs. (or 8.89 Newtons) Of course, other haptic manipulator designs or haptic manipulators with different specifications can be used and this is just one example. For example, haptic manipulators such as the Geomagic Touch™ or Quanser™ may be used.

Figure 3:
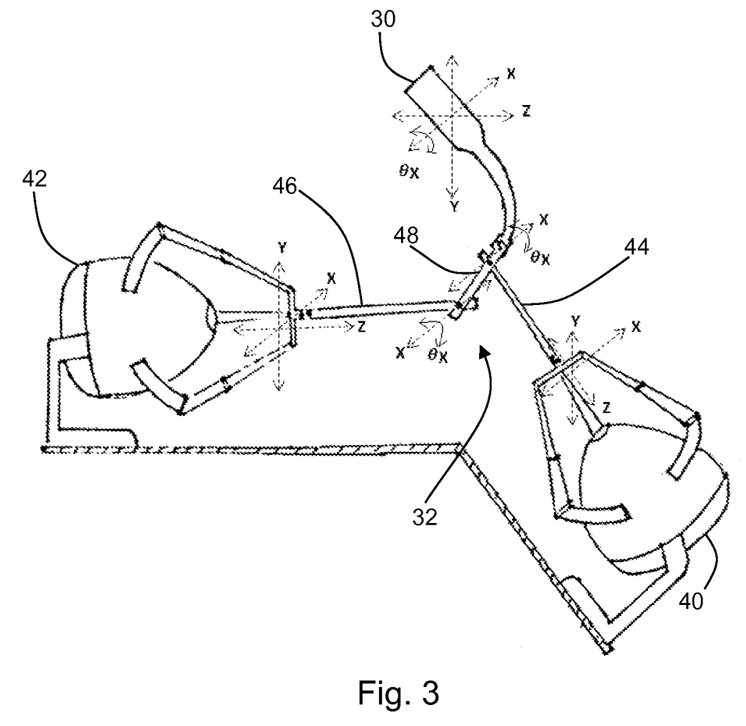
FIG. 3 is a side view of an embodiment of haptic manipulators for the haptic intubation simulator.
Figure 4:
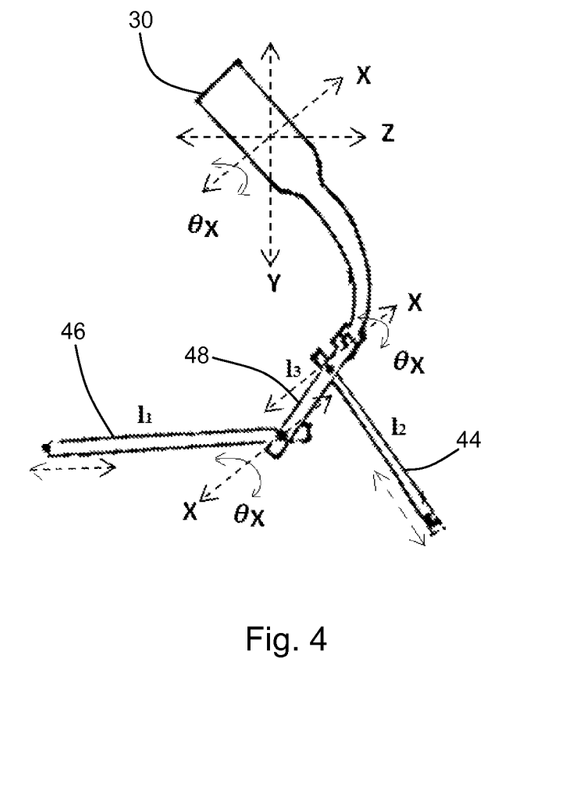
FIG. 4 is another side view of an embodiment of the linkage for the haptic intubation simulator.

FIG. 3 is a side view of an embodiment of haptic manipulators for the haptic intubation simulator 10. A linkage 32 is used to provide force with four degrees of freedom and torque feedback to the glide scope 30. The linkage 32 includes a first rod 44 connected to the first haptic manipulator 40, a second rod 46 connected to the second haptic manipulator 42, and a third rod 48 connected to the first rod 44, the second rod 46, and the glide scope 30. In one example, the glide scope 30 is connected to or positioned on the linkage 32 by connecting pins of a suitable diameter and length. The first rod 44 is connected to the third rod 48 by a first clevis rod end and is configured to pivot about the third rod 48. The second rod 46 is connected to the third rod 48 by a second clevis rod end and is configured to pivot about the third rod 48. FIG. 4 is another side view of an embodiment of the linkage 32 for the haptic intubation simulator 10. Other hinges or yoke end linkage besides the first and second clevis rod ends also may be used.

The linkage 32 may be fabricated of any material that can, for example, withstand the forces generated by the first haptic manipulator 40 and second haptic manipulator 42. In one example, the linkage 32 can withstand approximately 5 lbs. or more of force or torque. The linkage 32 may be fabricated of steel, plastic, acrylic, carbon fiber, fiber-reinforced plastic, or other materials. In one embodiment, the first rod 44 may have dimensions of approximately 6"×0.4"×0.4", the second rod 46 may have dimensions of approximately 6"×0.4"×0.4", and the third rod 48 may have dimensions of approximately 4"×0.4"×0.4".

Figure 5:
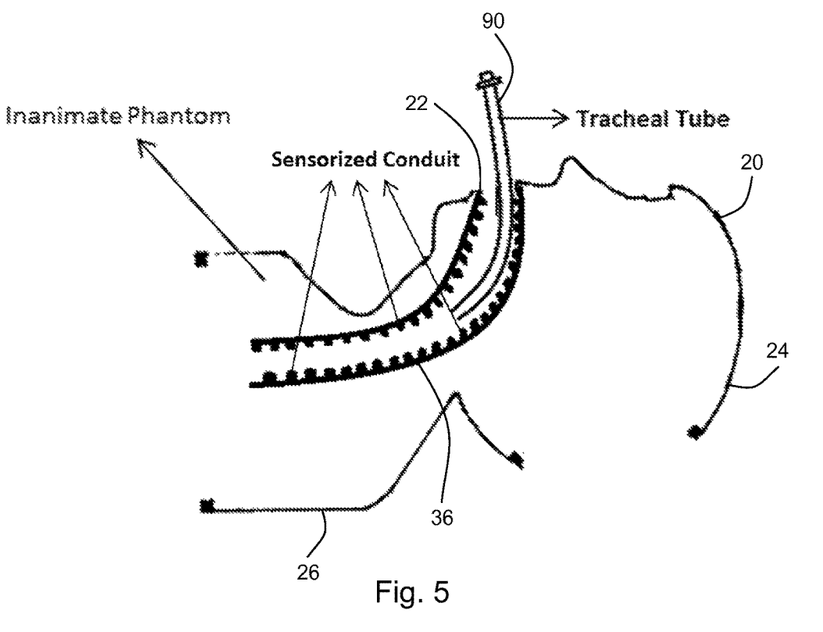
FIG. 5 is another cross-sectional side view of an embodiment of the haptic intubation simulator.

FIG. 5 is another cross-sectional side view of an embodiment of the haptic intubation simulator 10. The trachea of the human mannequin may be represented by or encompassed by the sensorized conduit 36. The linkage 32 may be adjacent or parallel to the plane of the sensorized conduit 36. Force sensors are located on or in the wall of the sensorized conduit 36 in this example. The force sensors may be placed approximately 1 cm to 2 cm apart in one embodiment and may be used to monitor the position and movement of the tracheal tube 90. For example, using forces measured by the force sensors, the simulator 10 can detect the position of the tracheal tube 90 and any rupture or injuries to the trachea caused by the application of excessive forces.

In a particular embodiment, these force sensors may have a force/pressure minimum of 0 N, a force/pressure maximum of 4.4 N, a maximum response time of 5 μs, a minimum operating temperature of −90° C., a maximum operating temperature of 600° C., and a sensing area of approximately 71.3 mm². Of course, other force sensor designs or force sensors with different specifications can be used and this is just one example. In another particular embodiment, other types of sensors are used.

Figure 6:
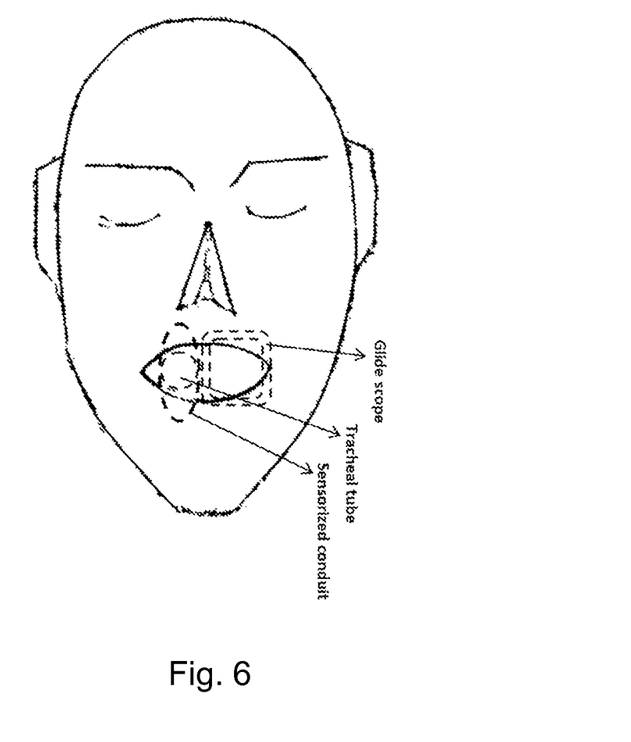
FIG. 6 is a top view of the mannequin for the haptic intubation simulator.

FIG. 6 is a top view of the mannequin 20 for the haptic intubation simulator 10. The mouth of the human mannequin 20 is connected to the sensorized conduit 36. The glide scope 30 and tracheal tube 90 are both located in the sensorized conduit 36. The glide scope 30 may be offset to the side of the mouth 22 of the human mannequin 20 in one example.

The haptic intubation simulator 10, including the first haptic manipulator 40 and second haptic manipulator 42, is connected to a controller. The controller may be connected to a display screen, such as a computer monitor or a television. This may be a high-resolution display screen positioned for viewing by the user, instructor, or other observers. The display screen can be positioned in front of the simulator 10 and facing the user in one example. Any orientation that makes performing the procedure or that enables manipulating the instruments while providing visual information to the user possible without disruption may be used. This may be a front-facing orientation in one example.

This controller contains software that can provide users with visualization and force feedback in real time. This controller may be connected with, receive measurements from, or may manage the simulator. The force feedback may be in response to the position of the tracheal tube or the glide scope. Control algorithms can match the haptics with the simulated environment. The software also may contain a library that provides a high level layer that encapsulates the rendering of a simulated environment on the display screen in real-time. The library also may provide calibration for matching the simulator to the simulated environment.

In one example, the software provides 3D modeling file formats and video rendering formats permitting specification of polygonal surfaces and visual appearances. The visual appearance specifications include particular texture, color, shininess, and transparency. The software also may provide haptic specifications including stiffness, viscosity, static friction, dynamic friction, and device control friction.

The simulated environment includes graphics that are displayed on the display screen. The simulated environment is displayed in real-time with respect to the forces applied by the haptic manipulators and may be generated in response to the sensors or other inputs. For example, the graphics on the display screen may be in response to the position of the glide scope or to sensors in the sensorized conduit.

The simulated environment may be selected from a library. There may be multiple simulated environments in the library. Each simulated environment may be associated with or correspond to one or more scenarios. For example, a particular simulated environment, such as a patient of a particular age, weight, or a particular trachea anatomy, may be selected. In another example, a particular scenario, such as a particular trauma or a particular medical procedure, may be selected.

This simulator may be used as a training or teaching tool to practice tracheal intubations. An instructor may, for example, select a particular simulated environment or scenario for users to practice with. The simulator may be used to practice tracheal intubations on, for example, a patient with neck wounds, an infant, a patient with a throat tumor, a patient with a tracheal blockage, or other situations. The display screen will display a corresponding simulated environment. The haptic manipulators will project corresponding forces to this simulated environment. The simulated environment may change or act in response to positions of the glide scope or tracheal tube, measurements from the sensors, an elapsed time, or other parameters. Actions of the user may affect the simulated environment. For example, if a user applies too much force, the simulated environment may display tracheal lacerations. In another example, if the user moves the instrument with high velocity or acceleration, the system will display a warning to the user.

The controller may record or communicate the user's performance. For example, the success of the tracheal intubation or any injuries to the patient may be determined. The user's performance may be communicated in real-time or may be communicated at the end of the simulation.

Figure 7:
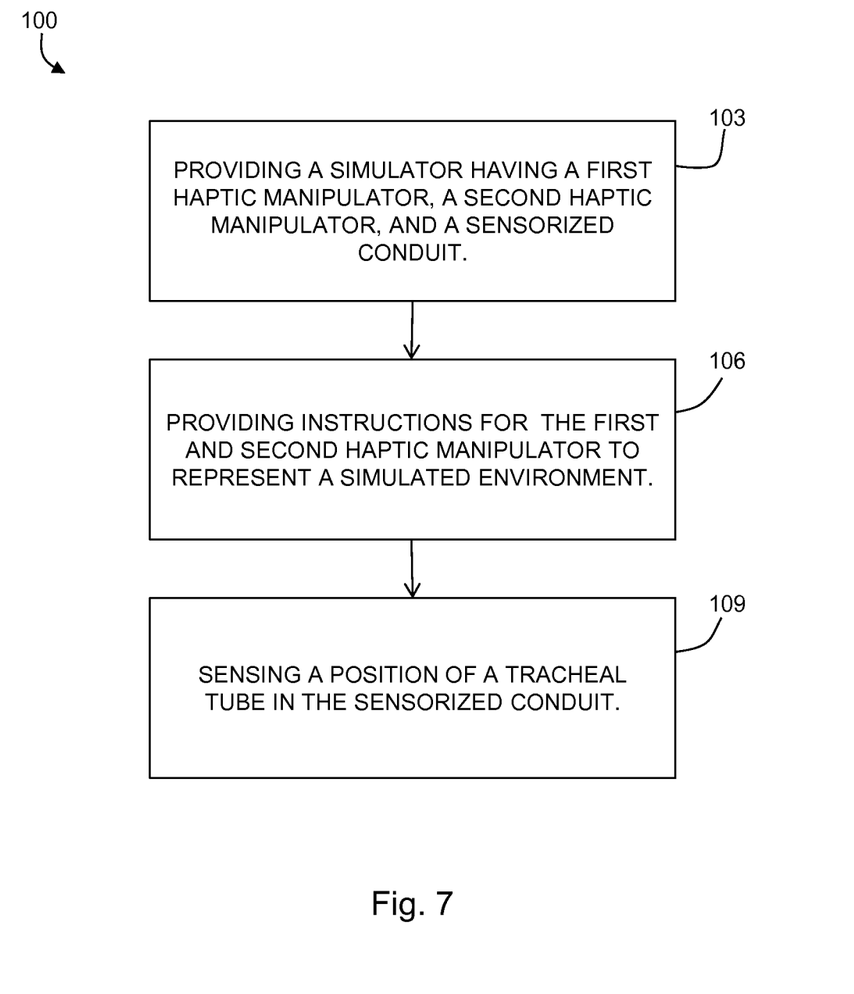
FIG. 7 is a flowchart of another embodiment of the present disclosure.

The present disclosure may be embodied as a method 100 comprising providing 103 a simulator as disclosed above. For example, the provided 103 simulator may comprise a human mannequin comprising a head and a torso, said human mannequin defining a mouth and a sensorized conduit; a glide scope disposed in said sensorized conduit; through said mouth; a first haptic manipulator connected to said glide scope through said head, wherein said first haptic manipulator is configured to provide force in three dimensions; and a second haptic manipulator connected to said glide scope through said torso, wherein said second haptic manipulator is configured to provide force in three dimensions.

Instructions are provided 106 for said first haptic manipulator and said second haptic manipulator to represent a simulated environment. For example, a controller may be used to provide computer instructions for causing the manipulators to provide haptic feedback to the user by way of the glide scope. In this way, an intubation of a human is simulated through the haptic feedback on glide scope. A position of the tracheal tube is sensed 109 in the sensorized conduit. In this way, placement of the trachea can be determined, for example, by a controller.

The simulator disclosed herein may be used by multiple groups or users. For example, the simulator may be used by doctors, medical students, paramedics, combat medics, or other emergency personnel. The scenarios may be tailored to fit a particular type of user. For example, combat medics may use scenarios and simulated environments common to soldiers or wartime injuries. A doctor may use scenarios and simulated environments that focus on typical patients in his or her practice.

This simulator provides multiple benefits to users not available in other systems. A user can practice on the simulator without risk to a patient. The user can "feel" resistance provided by the haptic manipulators during the simulation, which provides hands-on learning. A wide variety of different simulations can be provided, including very particular simulations that may only rarely occur or that apply to only a small percentage of the medical community. The user's performance can be assessed by quantitative metrics such as force, torque, tissue damage, or percentage of time the instrument was on the desired trajectory.

Although the present disclosure has been described with respect to one or more particular embodiments, it will be understood that other embodiments of the present disclosure may be made without departing from the spirit and scope of the present disclosure. Hence, the present disclosure is deemed limited only by the appended claims and the reasonable interpretation thereof.

What is claimed is:

1. A simulator, comprising:
    a human mannequin comprising a head and a torso, said human mannequin defining a mouth and a sensorized conduit;
    a glide scope disposed in said sensorized conduit through said mouth and configured to be adjacent to a tracheal tube within the sensorized conduit;
    a first haptic manipulator connected to said glide scope through said head, wherein said first haptic manipulator is configured to provide force in three dimensions;
    a second haptic manipulator connected to said glide scope through said torso, wherein said second haptic manipulator is configured to provide force in three dimensions; and
    a linkage connecting said first haptic manipulator and said second haptic manipulator to said glide scope.

2. The simulator of claim 1, wherein said simulator comprises a plurality of force sensors disposed along a wall of said sensorized conduit.

3. The simulator of claim 1, further comprising a tracheal tube.

4. The simulator of claim 1, further comprising a controller connected to said haptic manipulators.

5. The simulator of claim 4, further comprising a display screen connected to said controller.

6. A simulator, comprising:
    a human mannequin comprising a head and a torso, said human mannequin defining a mouth and a sensorized conduit;
    a glide scope disposed in said sensorized conduit through said mouth;
    a first haptic manipulator connected to said glide scope through said head, wherein said first haptic manipulator is configured to provide force in three dimensions;
    a second haptic manipulator connected to said glide scope through said torso, wherein said second haptic manipulator is configured to provide force in three dimensions; and
    a linkage connecting said first haptic manipulator and said second haptic manipulator to said glide scope, wherein said linkage is configured to provide force with four degrees of freedom and torque feedback to said glide scope.

7. The simulator of claim 6, wherein said linkage comprises a first rod connected to said first haptic manipulator, a second rod connected to said second haptic manipulator, and a third rod connected to said first rod, said second rod, and said glide scope.

8. The simulator of claim 7, wherein said first rod is connected to said third rod by a first hinge and wherein said second rod is connected to said third rod by a second hinge.

9. A method comprising:
providing a simulator comprising:
a human mannequin comprising a head and a torso, said human mannequin defining a mouth and a sensorized conduit;
a glide scope disposed in said sensorized conduit through said mouth and configured to be adjacent to a tracheal tube within the sensorized conduit; a first haptic manipulator connected to said glide scope through said head, wherein said first haptic manipulator is configured to provide force in three dimensions; and a second haptic manipulator connected to said glide scope through said torso, wherein said second haptic manipulator is configured to provide force in three dimensions; providing instructions for said first haptic manipulator and said second haptic manipulator to represent a simulated environment; and sensing a position of a tracheal tube in said sensorized conduit.

10. The method of claim 9, further comprising displaying an image representing said simulated environment on a display screen.

11. The method of claim 10, wherein said displaying is performed in real-time.

12. The method of claim 10, wherein said image is rendered in response to said position of said tracheal tube.

13. The method of claim 12, wherein said first haptic manipulator and said second haptic manipulator provide feedback in response to one of said position of said tracheal tube and a position of said glide scope.

14. The method of claim 9, wherein said simulated environment is selected from a library.

15. The method of claim 14, wherein said library contains a plurality of different simulated environments.

16. The method of claim 15, wherein each of said plurality of different simulated environments correspond with a scenario.

17. The method of claim 9, wherein said instructions comprise stiffness, viscosity, static friction, dynamic friction, and device control friction.

* * * * *